United States Patent Office 3,584,039
Patented June 8, 1971

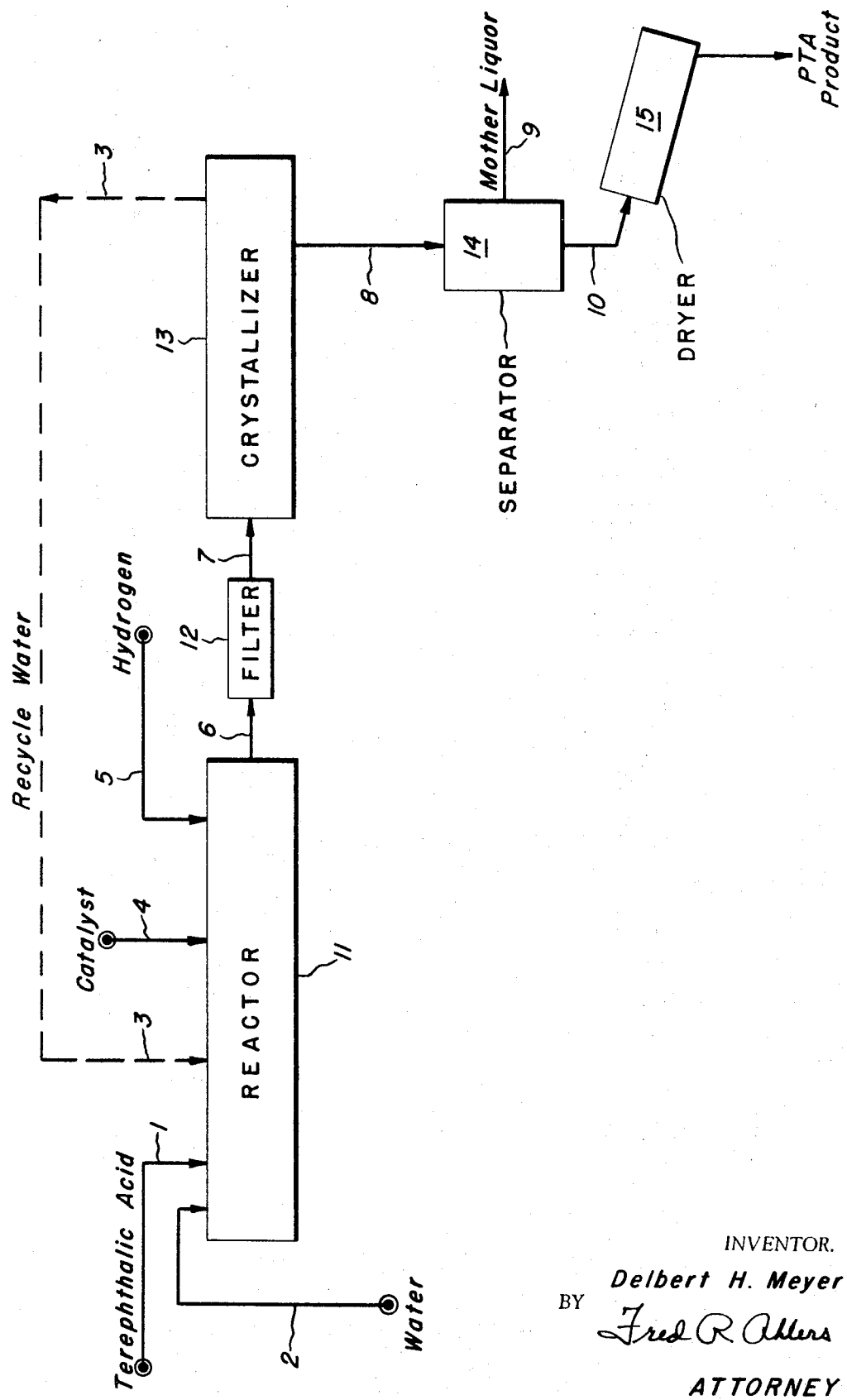

3,584,039
FIBER-GRADE TEREPHTHALIC ACID BY CATALYTIC HYDROGEN TREATMENT OF DISSOLVED IMPURE TEREPHTHALIC ACID
Delbert H. Meyer, Highland, Ind., assignor to Standard Oil Company, Chicago, Ill.
Continuation-in-part of application Ser. No. 351,506, Mar. 12, 1964, which is a continuation-in-part of application Ser. No. 269,181, Mar. 29, 1963. This application Aug. 30, 1967, Ser. No. 664,456
Int. Cl. C07c 51/42
U.S. Cl. 260—525                                    9 Claims

ABSTRACT OF THE DISCLOSURE

Fiber-grade terephthalic acid can be obtained by catalytic hydrogen treatment of solutions of impure terephthalic acid. The treated solution is separated from the catalyst and fiber-grade terephthalic acid is recovered by crystallization and separation from impurities retained in the aqueous mother liquor.

RELATED APPLICATIONS

The application is a continuation-in-part of my application Ser. No. 351,506, filed Mar. 12, 1964, now abandoned, which in turn was a continuation-in-part of my application Ser. No. 269,181, filed Mar. 29, 1963, now abandoned.

BACKGROUND OF THE INVENTION

This invention relates to the purification of terephthalic acid, and mor particularly concerns the preparation of fiber-grade terephthalic acid having a purity sufficient for direct esterification with glycols or alkylene oxides to produce super polyesters.

High molecular weight polyesters of terephthalic acid with various glycols find extensive use as Dacon, Terylene, Kodel, and Vycron fibers, and Mylar film. Polyesters of this type, first described in U.S. Pat. 2,465,319 to Whinfield and Dickson, have heretofore been prepared from dimethyl terephthalate, which is trans-esterified with the appropriate glycol and then polycondensed to form the polyester. Polyester preparation via dimethyl terephthalate has been considered the preferred route by reason of the exceptionally high purity requirements imposed on the polyester.

Recently, with the advent of improved processes for the manufacture of terephthalic acid, much attention has been directed to the possibility of obtaining polyesters by direct esterification of terephthalic acid with glycol or alkylene oxide. This would have manifest advantages of simplicity and economy as compared with the indirect dimethyl terephthalate route, as yet, however, there remains serious difficulty in obtaining terephthalic acid of suitable purity. Unless the initial terephthalic acid is virtually completely free from extraneous contaminants, the polyester will have too low a melting point and will be of unsatisfactory color.

Terephthalic acid impurities are of several types. The compound 4-carboxybenzaldehyde (4–CBA), an intermediate product in the oxidation of para-xylene, is found in impure terephthalic acid. Unidentified color-forming precursors and color bodies, possibly of the benzil, fluorenone or anthraquinone structure, are usually present. Nitro-compounds are found as impurities in terephthalic acid obtained by liquid phase nitric acid oxidation of para-xylene and other suitable starting materials. All of these impurities are deleterious with respect to polyester quality. And any method of purifying crude terephthalic acid to produce fiber-grade terephthalic acid must reduce or eliminate such impurities or convert them to substances inert in the production of super polyesters.

SUMMARY OF INVENTION

It has now been discovered, according to the invention, that terephthalic acid of a purity suitable for direct esterification with glycols or alkylene oxides to produce polyester films and fibers may be obtained from impure terephthalic acid containing 4-carboxybenzaldehyde, color bodies and other impurities by catalytically hydrogenating the impure terephthalic acid in aqueous liquid phase solution at elevated temperature and pressure. The reaction solution is separated from the catalyst and thereafter purified terephthalic acid is recovered by crystallization and separation from the aqueous mother liquor. The mother liquor contains the greater part of the impurities affecting the quality of the terephthalic acid for use in fiber and film formation.

Advantageously, the impure terephthalic acid is dissolved in water at a temperature and pressure sufficiently high to provide a solution and to maintain the solution in liquid phase, and the resulting solution is subjected to hydrogenation in the presence of a Group VIII metal on an inert support in the presence of hydrogen. After separation of the reaction solution from the catalyst, the crystallization is conducted with advantage by releasing the pressure which vaporizes water from the solution and cools the solution, thereby precipitating terephthalic acid crystals. The vaporized water can be condensed and recycled if desired to the dissolution step. The precipitated crystals of terephthalic acid recovered by separation from mother liquor are washed and dried. The mother liquor containing the process impurities is discarded.

Impure terephthalic acid which may be treated by the present process may be obtained from any source wherein the impurities to be eliminated are either converted by chemical or physical change in the process to materials which are water soluble under the conditions of crystallization, or are converted substantially by hydrogenation to materials which are inert in the purified terephthalic acid. Excellent results have been obtained when the impure terephthalic acid is that produced by the liquid phase oxidation of para-xylene with molecular oxygen (e.g. air) using a heavy metal and bromine as catalyst (Saffer et al. U.S. 2,833,816). Terephthalic acid from other processes, such as those employing liquid phase oxidation of p-xylene with molecular oxygen in the presence of a heavy metal oxidation catalyst promoted with acetaldehyde or methyl ethyl ketone, may also be treated with advantage. The terephthalic acid from the nitric acid oxidation of p-xylene containing nitro-compound impurities together with the above-mentioned impurities may be benefited by the process of this invention. Terephthalic acid from the isomerization of dipotassium orthophthalate, or the disproportionation of potassium benzoate, etc., may similarly be benefited by the process of this invention. By employing the inventive process, terephthalic acid from any source containing as much as two or three weight percent 4-carboxybenzaldehyde and containing impurities reducible or convertible under the conditions of the inventive process can be converted to fiber-grade terephthalic acid.

The process of the invention is conducted at elevated temperature and pressure while the terephthalic acid is dissolved in an aqueous solvent. By reason of its low solubility terephthalic acid requires either large volumes of water or high temperatures in order to obtain the desired terephthalic acid solution. Consequently, prior art efforts to purify terephthalic acid have generally employed organic solvents or aqueous solution of water soluble derivatives of terephthalic acid. According to my invention, a solution of terephthalic acid in water advantageously at a concentration of upwards of about ten percent by weight is advantageously employed. The process may be conducted within the range of about 200° C. up to the critical temperature of water (374° C.), advantageously in the range of 225–300° C., and preferably in the range of about 240 to about 275° C. or 280° C. At the preferred temperature range solutions of about 10 percent to about 30 percent by weight terephthalic acid are preferably used. The quantity of water needed to dissolve the terephthalic acid at various temperatures may be estimated from the table below:

| Terephthalic acid g./100 g./H₂O: | Temperature, °C. for solution |
|---|---|
| 1 | 185 |
| 5 | 225 |
| 10 | 242 |
| 20 | 259 |
| 30 | 272 |

Most, if not all, of the impurities in the impure terephthalic acid are occluded in the crystals of terephthalic acid. By dissolving impure terephthalic acid in water, I have found that these impurities are then in solution and are exposed to catalytic hydrogen treatment.

Pressure conditions for the process of this invention depend upon the manner in which this process is conducted. Since the temperatures at which the impure terephthalic acid is dissolved in water are advantageously substantially above the boiling point of water and since the process of this invention is carried out in a manner to maintain a liquid phase of the aqueous solution, the process of this invention is necessarily carried out at a pressure above atmospheric pressure. Total pressures at and above the sum of the partial pressures of water vapor and hydrogen at the chosen operating temperatures are advantageously used.

When the process of this invention is carried out by batch treatment of individual batches of aqueous solutions of impure terephthalic acid under static conditions as in a sealed autoclave, higher hydrogen partial pressures to provide the hydrogen driving force are usually required to dissolve the hydrogen and permit it to diffuse to and reach the reducible dissolved impurities than are required for dynamic conditions whereby hydrogen in intimately dispersed throughout the solution as by vigorous stirring, by predissolving hydrogen in the aqueous solution, by bubbling hydrogen uniformly into the asueous solution, or by other dynamic means for providing intimate contact by hydrogen into the solution. These more dynamic means for providing intimate contact between hydrogen and the aqueous solution appear to result in lower driving forces necessary for the hydrogen to reach the dissolved reducible impurities. For example, lower hydrogen partial pressures or hydrogen driving forces are required where an aqueous solution of the impure terephthalic acid is percolated through a bed of hydrogenation catalyst and either a static hydrogen atmosphere or concurrent or countercurrent flow of hydrogen through the catalyst chamber is maintained. Indeed, the benefits of the percolation method for conducting the process of this invention can be obtained for a substantial period of time by percolating the aqueous solution of impure terephthalic acid over a hydrogenation catalyst extended on a porous support which has been saturated with adsorbed hydrogen. The adsorption of hydrogen by the porous support can be accomplished before contacting the catalyst with the impure aqueous solution of terephthalic acid or it can be accomplished with contacting the catalyst with the impure aqueous solution of terephthalic acid. Thus, the process of this invention can be practiced by intermittent introduction of hydrogen into the bed of extended catalyst during the continuous introduction of the aqueous solution of impure terephthalic acid. The minimum hydrogen to be introduced intermittently is, of course, an amount of hydrogen in excess of that required for reduction of the dissolved impurities.

It may be desirable to use an inert gas under operating conditions, for example nitrogen. The use of inert gas advantageously provides for the controlling of hydrogen concentration at low values. The inert gas can be used as a separate gas stream but preferably the inert gas is mixed with the hydrogen introduced into or with the solution prior to contact with the catalyst.

Very little hydrogen is consumed by the purification process. Low partial pressures of about 1 to 3 pounds per square inch absolute can be used to provide the benefits of the process of this invention but these low hydrogen partial pressures are not commercially attractive because purification may be slow or incomplete. Hydrogen partial pressures of 10 p.s.i.a. up to 150 p.s.i.a. are useful and provide technically and commercially attractive conditions. Under the reaction conditions it is preferred to use hydrogen in the range of 1 to 5 moles excess over the stoichiometric amount required for the principal reducible impurities, 4-carboxybenzaldehyde and the characteristically yellow-colored impurities, while making allowance for other impurities of unknown structure. The reduction of the aldehyde group of 4-carboxybenzaldehyde is desirable but in addition it serves as a useful yardstick to measure the reduction or conversion of characteristically yellow-colored and other impurities. The nature of the end products of all of these impurities is not known but, by optical density measurement of the terephthalic acid product recovered after catalystic hydrogen treatment, their absence or lowered concentration can be noted. Severe hydrogenation should be avoided so that conversion of terephthalic acid to such other products such as cyclohexane 1,4-dicarboxylic acid and p-toluic acid does not occur.

A hydrogenation catalyst is required in the invention method for reducing undesirable impurities. I have found to be efficacious a wide variety of hydrogenation catalysts; for example, the hydrogenation catalysts mentioned in Kirk and Othmer's "Encyclopedia of Chemical Technology" (Interscience), particularly the chapters on Hydrogenation and Catalysts; Emmett's "Catalysis" (Reinhold), particularly volumes IV and V on Hydrogenation; Lohse's "Catalytic Chemistry" (Chemical Publishing Company) particularly the sections on Group VIII Metal Catalysts; and catalysts mentioned in such patents as Amend U.S. 2,070,770 and Lazier U.S. 2,105,664. But for the method of this invention I prefer to use as catalysts the Group VIII Noble metals that include ruthenium, rhodium, palladium, osmium, irridium, and platinum. Hydrogenation catalysts other than those of Group VIII Noble metals may reduce impurities but their use is disadvantageous. Aqueous solutions of terephthalic acid at temperatures of from 200° C. up to the critical temperature of water have unusual properties with respect to catalysts. Most all of the hydrogenaton catalysts, except the Group VIII Noble metals, whether in the form of elemental metals or in the combined form, e.g. oxides and salts, are attacked by terephthalic acid and appear as terephthalate salts. Many of these terephthalate salts are colored and appear as color-body impurities in the recovered terephthalic acid. Accordingly, additional special purification steps must be employed, such as converting all the terephthalic acid to alkali or ammonium salts to precipitate the metals, filtering off the precipitated metals, and acidifying the filtrate to regenerate free terephthalic acid. For this reason I prefer not to use as catalyst such metals as iron, cobalt, copper, and nickel, either as finely divided elemental metals or their salts. The use of Group VIII Noble metals in salt form may also result in the formation of Noble metal terephthalic acid salt and/or free Noble metal impurities. Recovery of terephthalic acid would require the utilization of the aforementioned additional purification steps. For the treatment of impure terephthalic acid to obtain fiber-grade terephthalic acid, the most useful catalysts having the requisite stability and inertness to reaction or solution under the conditions of operation are the Group VIII Noble metals when used as elemental metals.

The preferred Group VIII Noble metal catalysts can be used supported or unsupported. Aqueous solutions of terephthalic acid at temperatures of 200° C. up to the critical temperature of water are unusual in their effect however on most of the conventionally used supports. Hot aqueous solutions of terephthalic acid dissolve supporting materials such as natural and synthetic alumina, silica, silica-alumina, kieselguhr, calcined clays, zirconium supports and other metal oxides and metal salt containing supports. Supports that are insoluble in water and unreactive with terephthalic acid at temperatures of about 200° C. and higher are preferably used in the method of this invention. The various carbons and charcoals are inert and are particularly suitable as supports. Desirably these supports should have a low extraneous metal content.

Accordingly, a suitable catalyst is a Group VIII Noble metal supported on carbon and/or charcoal, the Group VIII Noble metal content being in the range of 0.1 to 5.0 percent, preferably it is in the range of 0.3 to 1.0 percent by weight.

The effect of aqueous solutions of terephthalic acid on commonly used catalyst supports other than carbon and charcoal is illustrated by the following where all the named supports were contacted for one hour with aqueous terephthalic acid solution containing 10 parts solute per 100 parts solvent by weight at temperatures of 245° to 250° C. and pressures to maintain liquid phase conditions. The aqueous solution was separated from the solid catalyst support and cooled to crystallize terephthalic acid. The terephthalic acid crystals were recovered by filtration. The filter cakes were washed with water and dried. Emission spectra were used to determine metal content in the recovered dry terephthalic acid.

| Support: | Metal content, p.p.m. |
| --- | --- |
| Silica | Si—750 |
| Silicon carbide | [1] Si—110 |
| Alpha-alumina | Al—38 |

[1] 4-hour treatment—yellow terephthalic acid filter cake.

The mother liquor remaining from the test run with silicon carbide was evaporated to dryness and by emission spectra of the solids the silica content in those mother liquid solids was found to be 18,000 p.p.m. or 1.8 weight percent.

For fiber-grade terephthalic the commercially acceptable maximum total is an ash content of 15 parts per million. The above data demonstrate that the ash content contributed by silica, alumina and silicon carbide supports exceeds the maximum permissible ash content and therefore these supports are not useable.

I have also discovered it desirable to conduct the separation and recovery of terephthalic acid from the slurry of precipitated terephthalic acid crystals in the remaining aqueous solution at a somewhat elevated temperature in the range of 50° to 150° C. This permits a more substantial quantity of the impurities to remain dissolved in the aqueous mother liquor separated from the terephthalic acid crystals. Advantageously that retention of dissolved impurities in the mother liquor is achieved by conducting the separation and recovery of precipitated terephthalic acid crystals at a temperature in the range of 80° to 150° C. Those separation and recovery temperature ranges can be conveniently attained by conducting the cooling of the treated and filtered solution for precipitating crystals of terephthalic acid down to temperatures in the range desirably 50° to 150° C. and advantageously 80° to 150° C. thus providing the slurry of precipitated terephthalic acid crystals at the above separation and recovery temperatures.

The method of this invvention can be conducted batchwise or continuously. In the batchwise operation, hydrogen or a mixture of hydrogen and in inert gas is added to the combination of the solution and catalyst in a closed system, such as in a closed autoclave. The continuous operation is advantageously conducted with a bed, static or moving, of solid catalyst because fresh or regenerated catalyst can be supplied as needed without any substantial delay or loss of processing time. The aqueous solution containing dissolved hydrogen may be passed through a bed of solid catalyst. Such continous flow is preferred because more intimate contact between solution, hydrogen, and catalyst can be obtained. Additional hydrogen can be added incrementally if desired.

Another embodiment of a continuous system is a percolation system which provides a thin film of aqueous solution on the catalyst particles and an efficient hydrogen mass transfer from the gaseous phase. Alternatively, the process of this invention can be practiced by intermittent introduction of the aqueous solution of impure terephthalic acid. Under the reaction conditions no separate gas phase of hydrogen is required. The minimum amount of hydrogen to be introduced is the amount of hydrogen in slight excess of that required for reduction of the dissolved impurities. Enough hydrogen is used to accomplish this and all of the hydrogen can be in solution.

The drawing is a simplified schematic flow plan of a preferred embodiment of the invention. It is to be understood that this embodiment is for the purpose of illustration and is not to be regarded as a limitation of the scope of the present invention.

Referring to the drawing, impure terephthalic acid fed through line 1 is dissolved in water fed into the reactor 11 via lines 2 and/or 3 at a temperature and pressure sufficiently high to provide a solution and to maintain the solution in the liquid phase. Suitably prior to the introduction of the impure terephthalic acid solution Group VIII Noble metal catalyst on an inert support is added through line 4 into the reactor 11. To the impure terephthalic acid solution in the reactor 11, hydrogen is passed through line 5. Advantageously in a continuous system, the impure acid is predissolved in the water feed in a separate vessel and the hydrogen may be injected in the feed line to reactor 11. Reactor effluent is passed through line 6 to filter 12 and then through line 7 to crystallizer 13. The crystallization is conducted with advantage by releasing the pressure which vaporizes water from the solution and cools the solution thereby precipitating terephthalic acid crystals. The vaporized water is condensed and may be refluxed in line 3 or, with advantage, may be recycled through line 3 to reactor 11. The slurry of precipitated crystals of terephthalic acid is fed through line 8 into separator 14 where the crystals are separated from the mother liquor, e.g. by filtration or centrifugation. Mother liquor containing impurities is discarded through line 9. The precipitated crystals of terephthalic acid may be washed and as indicated are passed through line 10 into drier 15 where they are dried and from which the pure fiber-grade terephthalic acid is recovered.

A number of illustrative examples are given from which those skilled in this art can readily draw in selecting conditions suited for their particular circumstances.

EXAMPLES

Except as otherwise specifically noted, all of the following examples were conducted by admixing the designated quantities of catalyst, terephthalic acid, and water at room temperature in a pressure vessel equipped with means for agitating its contents. Hydrogen gas was introduced to the designated pressure, the vessel sealed, and the contents heated to the specified temperature and maintained at that level for the indicated time. Thereafter, the vessel was permitted to cool to room temperature (where a solid catalyst is employed this catalyst is filered out at reaction temperature prior to cooling), and the crystallized terephthalic acid was filtered off. 4-carboxybenzaldehyde content was determined on the filtered product. The results are given in Table I.

Run 1, utilizing a conventional nickel-on-kieselguhr hydrogenation catalyst, gave a substantial reduction in 4-carboxybenzaldehyde content but recovered terephthalic acid was found to be contaminated with catalyst. Similarly, Run 6 with $PdCl_2$ catalyst gave a substantial reduction in 4-carboxybenzaldehyde but recovered terephthalic acid was also contaminated with catalyst. Runs 2, 4 and 6 illustrate results that may be expected with the preferred catalysts of this invention.

The 4-carboxybenzaldehyde (4–CBA) content of impure and purified terephthalic acid was determined by dissolving terephthalic acid in dilute alkali buffered to pH of 9 and subjecting the buffered solution to polarographic analysis. This method has been developed to a detectable limit of 10 p.p.m. 4-carboxybenzaldehyde.

DMF color was determined by dissolving 5 grams terephthalic acid in 100 milliliters dimethyl formamide, filtering the solution and determining the color of the filtrate by comparison with APHA color standards. This test indicates solution color of dissolved terephthalic acid.

TABLE I.—PURIFICATION OF AQUEOUS TEREPHTHALIC ACID SOLUTIONS
[Hydrogenation conditions (c)]

| Example | Catalyst | Catalyst, grams | Terephthalic acid, g. | Water, cc. | Temp., °C. | $H_2$ Press., p.s.i.g., cold | Time, min. | Filtration, °C.c | 4-CBA, wt. percent |
|---|---|---|---|---|---|---|---|---|---|
| 0 | None | | | | | | | | 0.128 |
| 1 | 65% Ni on kieselguhr | 0.1 | 30 | 350 | 243 | 130/120 | 60 | 22 | 0.006 |
| 2 | 5% Pd on C powder a | 0.133 | 30 | 350 | 243 | 100/90 | 90 | 22 | 0.0009 |
| 3 | 0.5% Pd on C powder | 4.0 | 100 | 1,000 | 246 | 100/— | 120 | 22 | 0.003 |
| 4 | 0.1% Pd on C b | 4.0 | 100 | 1,000 | 246 | 100/— | 120 | d 22 | 0.003 |
| 5 | 5% Pt on C powder | 0.1 | 30 | 350 | 246 | 105/105 | 95 | 22 | 0.0026 |
| 6 | $PdCl_2$ | 0.0616 | 30 | 350 | 243 | 100/90 | 60 | 22 | f 5 | a Matheson, Coleman, & Bell.
b Engelhard.
c Cooled slowly, unless otherwise specified.
d 50 minutes to 204°, rapidly to 22°.
e Runs with 350 cc. water were in 810 ml. S.S. Rocker Bomb, agitation terminated at end of reaction time; other runs were in 1-gallon Magnedrive Bomb, agitation continued during cooling cycle.
f Parts per million.

In the illustrative examples shown in Table II a percolation method of conducting the process of the invention was employed. In the percolation method catalysts containing 0.2% and 0.5% by weight palladium supported on 4–8 mesh granular carbon were employed as the hydrogenation catalysts. The catalysts were wet screened through a 10 mesh screen (hole size 0.62 inch). The wet screened catalyst was added to a titanium tube and the catalyst was held in place by a titanium plate screen. An aqueous solution of impure terephthalic acid entered the top of the column and the treated solution was withdrawn from the bottom of the column. Hydrogen, or hydrogen-containing gas, was added at the top of the column in concurrent flow with the aqueous solution. The treated solution flowing from the column was filtered and collected under pressure and thereafter depressurized and cooled to crystallize therefrom dissolved terephthalic acid. The crystallized terephthalic acid was recovered by filtration and was washed and dried. The mother liquor containing impurities was discarded. The purity of the washed and dried terephthalic acid was determined.

TEG color was determined by esterifying 4.0 grams TA with 28.4 milliliters triethylene glycol at 260° C. for 90 minutes. The resulting mixture was slowly cooled to 25° C. (about 30 minutes) and was added to 25 milliliters of isopropanol in a 50 cc. volumetric flask to the calibration mark. This isopropanol solution was filtered and the filtrate color was determined by comparison with APHA color standards. The TEG color is an indication of reactivity color, i.e. the color impurities cause during reaction of TA with a glycol.

Optical density values were determined by the use of a spectrophotometer and relate to a 4 cm. cell. Light of 380 millimicron ($m\mu$) and 340 $m\mu$ wave lengths was used. The use of 380 $m\mu$ wave length light may initially have been adequate for determining qualitative purity of terephthalic acid. However, commercial producers of polyesters did not find such terephthalic acid suitable for their use in the direct esterification route because of the persistence of a yellow discoloration. Hence it became necessary to find another wave length light to detect more precisely the residual presence of undesirable impurities. For TABLE II.—PURIFICATION OF AQUEOUS TEREPHTHALIC ACID SOLUTIONS BY THE PERCOLATION METHOD

| Example Number | 7 | 8 | 9 | 10 | 11 | 1 |
|---|---|---|---|---|---|---|
| 4-CBA in feed, p.p.m. | 4,070 | 4,070 | 4,300 | 6,600 | 4,300 | 1,900 |
| Feed solution: | | | | | | |
| Dissolved solids, wt. percent | 12.9 | 9.38 | 9.0 | 9.0 | 9.0 | 19.4 |
| Temperature, °C | 260 | 249 | 248 | 248 | 248 | 278 |
| Pressure, p.s.i.g. | 690 | 580 | 670 | 670 | 670 | 974 |
| Space velocity a, lb./hr./ft.³ | 39.4 | 37.1 | 34.5 | 47.7 | 34.5 | 81 |
| Mole ratio $H_2$/4-CBA | 91 | 16.6 | 250 | 160 | 250 | 24 |
| Hydrogen pressure, p.s.i.a. | 24 | c 9.0 | 120 | 120 | 120 | 95 |
| Recovered terephthalic acid: | | | | | | |
| 4-CBA, p.p.m. | 10 | <10 | <10 | <10 | <10 | <16 |
| Optical density, 380 $m\mu$ | 0.026 | 0.009 | 0.018 | 0.026 | 0.006 | 0.015 |
| Optical density, 340 $m\mu$ | 0.036 | 0.024 | 0.029 | 0.043 | 0.016 | 0.036 |
| p-Toluic acid, p.p.m. | 2300 | 180 | 58 | 110 | 83 | 91 |
| DMF color | 15–20 | 0–5 | 0–5 | 5–10 | 0–5 | 0–5 |
| Separation temperature, °C | b 102 | 112 | 126 | 126 | 126 | 110 |
| Catalyst (Pd on carbon) percent | 0.2 | 0.2 | 0.5 | 0.5 | 0.5 | 0.5 | a Space velocity is in pounds of solution per hour per cubic foot of catalyst bed.
b Solution separated from catalyst is cooled to 160° C., flashed to atmospheric pressure and 102° C. and crystals separated at 102° C.
c Achieved using 30 mole percent hydrogen and 70 mole percent nitrogen.

It is evident from the data in Table II that the process of the invention is capable of producing exceptionally high quality terephthalic acid, capable of meeting even the most stringent requirements of fiber-grade material.

For a better understanding of the method of this invention and the illustrative embodiments of the invention, the description of auxiliary tests and their significance is given.

this, light of 340 $m\mu$ wave length was selected and was found to be more precise. With this more precise method, it was found that an optical density value of not more than 0.05 is a desirable target value for fiber-grade terephthalic acid.

According to these tests fiber-grade terephthalic acid can be characterized as having not more than 25 parts per million of 4-carboxybenzaldehyde and having a DMF color not exceeding 10 APHA. In addition, the moisture content should not exceed 0.5% and the acid number should be 675±2. The oxide ash (metals) should not be more than 15 parts per million. In addition, the performance of the terephthalic acid must be satisfactory in production of commercially acceptable super polyester fibers and film.

From the foregoing it is therefore apparent that the inventive process is capable of producing fiber-grade quality terephthalic acid.

I claim:

1. A process for producing fiber-grade terephthalic acid from an impure terephthalic acid having as impurities 4-carboxybenzaldehyde, color bodies and color-forming precursors derived from catalytic liquid phase oxidation of p-xylene with molecular oxygen, which process consists essentially of the following sequence of operations:
   (a) treating an aqueous solution containing at least about 10 percent of the impure terephthalic acid with hydrogen at a temperature in the range of 240° C. up to 374° C. and at pressure sufficient to maintain the solution in the liquid phase in the presence of a supported or unsupported metallic Group VIII Noble metal catalyst wherein both the metal and support components are insoluble in said solution at said temperature and at a hydrogen partial pressure of from 3 to 150 pounds per square inch.
   (b) separating the treated solution from the catalyst;
   (c) crystallizing terephthalic acid from the separated solution while retaining impurities and their reduction products dissolved in the resulting mother liquor at a temperature in the range of 50° C. to 150° C.;
   (d) separating the mother liquor as a liquid phase containing dissolved impurities and reduction products from said crystals while continuing to maintain a temperature in the range of 50° C. to 150° C.; whereby purified crystals of fiber-grade terephthalic acid are recovered.

2. The process of claim 1 wherein the catalytic hydrogen treatment is effected at a temperature within the range of 240° to 300 C., in a continuous flow system.

3. The process of claim 1 wherein the concentration of terephthalic acid in the aqueous solution is in the range of about 10 to 30%.

4. The process of claim 1 wherein the catalyst is metallic Group VIII Noble metal extended on a carbon support.

5. The process of claim 4 wherein the Noble metal is palladium.

6. The process of claim 1 wherein the aqueous solution and hydrogen are percolated through a bed of metallic palladium extended on carbon support.

7. The process of claim 6 wherein hydrogen at a partial pressure of 10 to 150 pounds per square inch is introduced continuously with the aqueous solution.

8. The process of claim 6 wherein the catalyst in the percolation zone is 0.1 to 5.0 weight percent palladium supported on carbon and the solution and hydrogen are percolated concurrently through the catalyst bed.

9. The process of claim 2 wherein the separation of mother liquor containing dissolved impurities from precipitated crystals is effected at a temperature in the range of 80° to 150° C. and the mother liquor is discarded.

References Cited

UNITED STATES PATENTS

| | | | |
|---|---|---|---|
| 3,151,154 | 9/1964 | Sargent et al. | 260—525 |
| 3,171,856 | 3/1965 | Kurtz | 260—525 |
| 3,058,997 | 11/1962 | Taylor et al. | 260—525 |

FOREIGN PATENTS

| | | | |
|---|---|---|---|
| 786,897 | 11/1957 | England | 260—525 |

CHARLES B. PARKER, Primary Examiner

R. S. WEISSBERG, Assistant Examiner

UNITED STATES PATENT OFFICE
CERTIFICATE OF CORRECTION

Patent No. 3,584,039      Dated June 8, 1971

Inventor(s) Delbert H. Meyer

It is certified that error appears in the above-identified patent and that said Letters Patent are hereby corrected as shown below:

Column 1, line 34:    "mor" should read -- more --

Column 1, line 40:    "Dacon" should read -- Dacron --

Column 1, line 56:    "As" should begin a new sentence

Column 3, line 48:    "asueous" should read -- aqueous --

Column 4, line 30:    "catalystic" should read -- catalytic --

Column 5, line 74:    "invvention" should read -- invention --

Column 6, line 1:    "in" should read -- an --

Column 7, line 52:    In the Example Number column following "11" the next number should be -- 12 -- not "1"

Column 7, line 59:    Under "Recovered terephthalic acid:" column
In "4-CBA, p.p.m." last example column " < 16" should read -- < 15 --
In "Optical density, 380 m$\mu$" last example column "0.015" should read -- 0.016 --.

Signed and sealed this 26th day of October 1971.

(SEAL)
Attest:

EDWARD M. FLETCHER, JR.      ROBERT GOTTSCHALK
Attesting Officer      Acting Commissioner of Patents